United States Patent Office 3,067,145
Patented Dec. 4, 1962

3,067,145
PROCESS FOR PREPARATION OF TITANIUM ACTIVATED BARIUM PYROPHOSPHATE PHOSPHOR
Richard C. Ropp, Towanda, Pa., assignor to Sylvania Electric Products Inc., a corporation of Delaware
No Drawing. Filed Oct. 25, 1960, Ser. No. 64,711
3 Claims. (Cl. 252—301.4)

This invention relates to phosphors for excitation by ultraviolet radiation, cathode-rays, X-rays, and the like and particularly to phosphors for fluorescent lamps. More particularly, this invention relates to improvements in preparing titanium-activated barium pyrophosphate phosphor for use in fluorescent lamps.

The phosphor has a pale blue emission similar to the well-known magnesium tungstate phosphor described by Ranby and Henderson, J. Electrochem. Soc. 98 479 (1951). The titanium-activated barium pyrophosphate phosphor is known to the art and described in United States patent to Ranby, No. 2,596,509. The phosphor described therein has an emission band peaking at 5000 A. with an exceptionally broad half width.

The phosphor itself possesses exceptional brightness in lamps, exceeding 60 LPW at 100 hours life. However, there are several features which are less desirable and it is an object of the present invention to present methods whereby these characteristics are improved, particularly the use of the phosphor in fluorescent lamp phosphor blends. I have found that $Ba_2P_2O_7$:Ti phosphor is improved by the inclusion in small quantities of aluminum, preferably as $AlF_3$, prior to a firing of the raw material mixture. The phosphors so produced are greener as well as brighter than those containing no Al. This increase in greenness is desirable since the use of these phosphors decreases or eliminates the need for the addition of a green correction phosphor such as the well-known zinc orthosilicate or willemite.

I have found that the emission color of the phosphor cannot be changed easily and that the addition of other materials such as antimony, magnesium, calcium or zinc in the form of various salts only dulls the phosphor. Only Al or Sr produces a greener phosphor, but the latter material produces one which is inferior in that the brightness is greatly decreased. It is preferable to use Al as the fluoride, since this salt also acts as a flux promoting crystal growth as well as a more efficient phosphor. A further improvement in the phosphor can be obtained by controlling the method of addition of the flux, $BaF_2$. The Ranby patent recommends $BaF_2$ as a flux, but I have found that an improvement is made when an equimolar amount of $(NA_4)_2HPO_4$ is added along with the $BaF_2$. Another improvement in the phosphor may be obtained by using $BaO_2$ in the material mix, since $Ba_2P_2O_7$:Ti must be fired in an oxidizing atmosphere to obtain bright phosphors. These improvements in the barium pyrophosphate phosphor may be used jointly or in combination with each other. It is an object of this invention to produce a greener phosphor by the modification of the titanium-activated barium pyrophosphate phosphor with aluminum in small quantities.

Another object of the invention is to provide an oxidizing atmosphere for the firing of the titanium-activated barium pyrophosphate phosphor by the addition of barium peroxide in small quantities.

Another object of the invention is to provide for an improved method of addition of the flux whereby it is formed in situ as the phosphor is produced from the raw materials during firing.

A feature of this invention is that the modified phosphor produced by the addition of the aluminum has a greener emission than previously obtained.

Another advantage of this invention is that the phosphor produced by reacting the raw materials in an oxidizing media with a barium peroxide additive is a substantially brighter phosphor.

Other features, objects and advantages will become apparent to those skilled in the art upon reading the following specification.

The effect on color by $AlF_3$ is illustrated in Table I which shows the ratio of green to blue plaque response. Greener phosphors cause an increase in green plaque response since a green filter is employed before the photomultiplier tube. The plaque brightnesses were obtained as percent of an arbitrary standard phosphor and the ratio of green to blue was then calculated.

TABLE I

| Weight Percent $AlF_3$ Added | Green to Blue Plaque Ratio | Phosphor | Condition |
|---|---|---|---|
| 0.0 | 0.96 | Streaked | Soft. |
| 0.5 | 1.01 | Non-uniform | Compact. |
| 1.0 | 1.03 | Uniform | Do. |
| 2.0 | 1.05 | ----do---- | Slightly sintered. |

The addition of the aluminum in increasing proportions to the phosphor raw material results in an increase in the green emission which is evident from Table I above. It is to be noted, however, that the amount added must be kept below about 2% since the phosphor is also increasing in its density. Above about 2% the product will be so compact as to render it substantially valueless as a phosphor for use in lamps.

In Table II is shown the effect of the $AlF_3$ on lamp brightness and color. $x$ and $y$ refer to the ICI color-coordinates as used for specifying color.

TABLE II

| Method (Weight Percent Added) | $x$ | $y$ | LPW 0 Hrs. | LPW 100 Hrs. | Percent Plaque Brightness |
|---|---|---|---|---|---|
| No additions | .293 | .309 | 60.0 | 55.4 | 100 |
| ½% $AlF_3$ Added | .294 | .315 | 62.4 | 58.5 | 101 |
| 1% $AlF_3$ Added | .293 | .323 | 60.4 | 57.4 | 103 |
| 2% $AlF_3$ Added | .293 | .331 | 59.9 | 56.4 | 106 |

It is readily apparent that Al produces greener phosphors as well as brighter lamps, since the "$y$" value increases with Al content. Furthermore the maintenance of the lamp is unimpaired by the addition.

The greener phosphors are desirable since the use of $Ba_2P_2O_7$:Ti in fluorescent lamp phosphor blends eliminates the need for a green color correction phosphor such as $Zn_2SiO_4$:Mn. Furthermore, the use of aluminum fluoride aids in the phosphor preparation, since with $AlF_3$, a uniform phosphor mass is obtained, whereas in the absence of $AlF_3$, the phosphor mass is streaked with inert portions and must be refired.

Even small amounts of the aluminum in the phosphor materially improve its brightness. As is shown in Table III, below, when only a trace amount of aluminum is present the brightness is relatively low; when increasing amounts are present the brightness is greatly enhanced.

TABLE III

Percent by weight aluminum present:     Percent blue plaque

Less than 0.0001% _____ 78
  Less than 0.01% _____ 91
  Less than 0.1% _____ 100

Another discovery is that the use of $BaO_2$ is the phosphor mix is advantageous since $Ba_2P_2O_7$:Ti must be fired in an oxidizing atmosphere to obtain bright phosphors.

For example, the effect of firing in various atmospheres is shown in Table IV.

TABLE IV

Atmosphere:     Percent blue plaque
  Air _____ 99
  $N_2$ _____ 92
  $N_2$—$H_2$ _____ 75
  Air—0.1% $BaO_2$ _____ 104

There is an optimum amount of $BaO_2$ required to produce the desired results as shown in Table V. These results show that low amounts of $BaO_2$ do not appreciably affect the phosphor whereas higher concentrations above about .5% by weight result in duller phosphors containing inert spots.

TABLE V

| Weight Percent BaO2 Added | Appearance of Phosphor | Percent Blue Plaque |
| --- | --- | --- |
| .003 | Uniform—normal | 100 |
| .01 | do | 100 |
| .05 | do | 100 |
| .1 | Uniform | 104 |
| .5 | Few small inert spots | 101 |
| 1.0 | Many inert spots | 97 |
| 2.0 | Very streaked—spots | 94 |

Therefore, in the practice of this aspect of the invention it is required to keep the barium peroxide additive below about .5% by weight in order to eliminate the streaking of the phosphor but still keep the requisite degree of brightness.

Lamp data shown in Table VI reveal that up to 0.5% $BaO_2$ by weight is beneficial.

TABLE VI

| Percent AlF3 By Weight | Percent BaO2 By Weight | Percent Blue Plaque | $x$ | $y$ | LPW | |
| --- | --- | --- | --- | --- | --- | --- |
| | | | | | 0 Hrs. | 100 Hrs. |
| .25 | | 99 | .262 | .327 | 61.7 | 57.9 |
| .25 | .01 | 100 | .265 | .327 | 62.6 | 59.2 |
| .25 | .10 | 104 | .262 | .327 | 61.2 | 58.2 |
| .25 | .50 | 101 | .263 | .327 | 61.6 | 58.5 |

It has further been discovered that an improvement can be obtained by controlling the method of addition of the $BaF_2$ flux. The Ranby patent aforesaid, recommends that $BaF_2$ be added as a flux, but I have found that an improvement can be gained when an equimolar amount of $(NH_4)_2HPO_4$ is added along with the $BaF_2$.

$$2BaF_2 + 2(NH_4)_2HPO_4 \rightarrow Ba_2P_2O_7 + 2NH_4F + H_2O$$

The advantage of this method lies in the fact that the ammonium fluoride flux is released slowly. However, if $NH_4F$ or $NH_4HF_2$ are employed as a flux separately, the results have been found to be inferior since the physical properties of the phosphor are adversely affected and a hard mass is obtained. Table VI shows the effect of the presence of $(NH_4)_2HPO_4$ with $BaF_2$ during firing.

| Percent BaF2 Present | $(NH_4)_2HPO_4$—Percent Blue Plaque | |
| --- | --- | --- |
| | None | Equimolar to BaF2 |
| .7 | 87 | 95 |
| 1.0 | 95 | 97 |
| 1.2 | 97 | 101 |
| 1.6 | 100 | 105 |

It is believed that the superior results occur only because the $NH_4F$ flux is released more slowly as the reaction proceeds.

Having described the improvements, I will now give specific examples.

*Example I*

Weigh out 1000.0 gm. $BaHPO_4$, 100.0 gm. $TiO_2$, 20.0 gm. $BaF_2$, 15.1 gm. $(NH_4)_2HPO_4$ and 10.0 gm. $AlF_3$. Blend these ingredients thoroughly and fire in an open 7 inch silica crucible for 4 hours at 1800° F. Cool the crucible and its contents, roll out and mix well the contents and refire for 4 hours at 1800° F. An excellent phosphor is produced.

*Example II*

Weigh out 1000.0 gm. $BaHPO_4$, 100.0 gm. $TiO_2$, 20.0 gm. $BaF_2$, 15.1 gm. $(NH_4)_2HPO_4$ and 5.0 gm. $AlF_3$. Blend well and fire as before. Cool the contents and add 5.0 gm. $AlF_3$. Blend the mixture thoroughly such as by hammermilling and refire for 4 hours at 1800° F. The above process produces a high quality phosphor.

*Example III*

Weigh out 1000.0 gm. $BaHPO_4$, 100.0 gm. $TiO_2$, 20.0 gm. $BaF_2$, 15.1 gm. $(NH_4)_2HPO_4$ and 1.0 gm. $BaO_2$. Mix and fire as described above. Cool the phosphor, roll out, mix in 5.0 gm. $AlF_3$ and refire as before. An excellent phosphor is produced.

*Example IV*

Weigh out 1000.0 gm. $BaHPO_4$, 100.0 gm. $TiO_2$, 20.0 gm. $BaF_2$, 15.1 gm. $(NH_4)_2HPO_4$ and 10.0 gm. $AlF_3$. Mix and fire as before. Cool the phosphor, add 1.0 gm. $BaO_2$, mix and refire as before. A high quality phosphor is produced when this procedure is followed.

Various modifications may be made by those skilled in the art without departing from the invention. It is my intent only to be limited in this invention by the scope of the appended claims.

I claim:

1. In the process for the preparation of a titanium activated barium pyrophosphate phosphor, the steps for improving the phosphor which comprise, adding together with a barium fluoride flux a substantially equimolar quantity of ammonium orthophosphate to the barium pyrophosphate forming materials prior to a firing.

2. In the process for the preparation of a titanium activated barium pyrophosphate phosphor, the steps for improving the green color rendition of phosphor which comprise, adding an aluminum fluoride in quantities substantially greater than 0 but less than 270 to the barium pyrophosphate forming raw materials mixture prior to a firing.

3. In the process for the preparation of a titanium activated barium pyrophosphate phosphor, the steps for improving the phosphor which comprises, adding 0.05 to 0.5% by weight barium peroxide to the barium pyrophosphate forming materials prior to a firing.

References Cited in the file of this patent

UNITED STATES PATENTS 2,596,509    Ranby _____ May 13, 1952
2,882,238    Uehara et al. _____ Apr. 14, 1959

UNITED STATES PATENT OFFICE
CERTIFICATE OF CORRECTION

Patent No. 3,067,145                      December 4, 1962

Richard C. Ropp

It is hereby certified that error appears in the above numbered patent requiring correction and that the said Letters Patent should read as corrected below.

Column 4, line 62, for "270" read -- 2% --.

Signed and sealed this 3rd day of September 1963.

(SEAL)
Attest:

ERNEST W. SWIDER                      DAVID L. LADD
Attesting Officer                      Commissioner of Patents